June 7, 1938.   E. G. VANDERBILT   2,119,691
CALF FEEDER
Filed Aug. 12, 1935

Inventor
Edwin G. Vanderbilt

By Homer K. Sweet
Attorney

Patented June 7, 1938

2,119,691

UNITED STATES PATENT OFFICE 2,119,691

CALF FEEDER

Edwin G. Vanderbilt, Fitzsimons General Hospital, near Aurora, Colo.

Application August 12, 1935, Serial No. 35,695

2 Claims. (Cl. 119—71)

This invention relates to a calf feeder adapted to be employed for the self-feeding of young calves at and subsequent to the weaning thereof, and has as an object to provide an improved device for the purpose set forth.

A further object of the invention is to provide an improved calf feeder arranged for the self-feeding of liquid food to young calves and which is adaptable for convenient use with a wide variety of liquid containers.

A further object of the invention is to provide an improved calf feeder which is adapted in use to closely simulate the feeding operation natural to a young calf.

A further object of the invention is to provide an improved calf feeder arranged for ready removal and replacement of the nipple element.

A further object of the invention is to provide an improved calf feeder that is simple and inexpensive of manufacture, susceptible of practical embodiment in a wide variety of specific forms, efficient in use, and arranged for ready rehabilitation to insure long practical usefulness.

My invention consists in the construction, arrangement and combination of elements hereinafter set forth, pointed out in my claims and illustrated by the accompanying drawing, in which—

Figure 1:
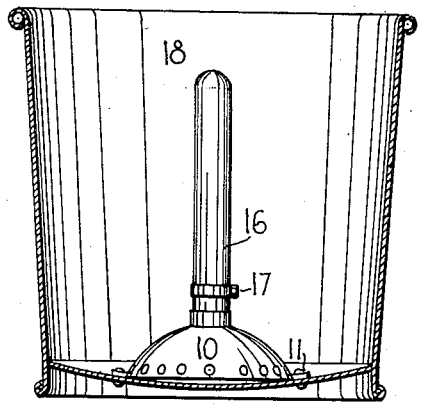
Figure 2:
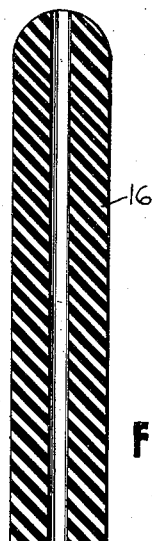
Figures 4, 5:
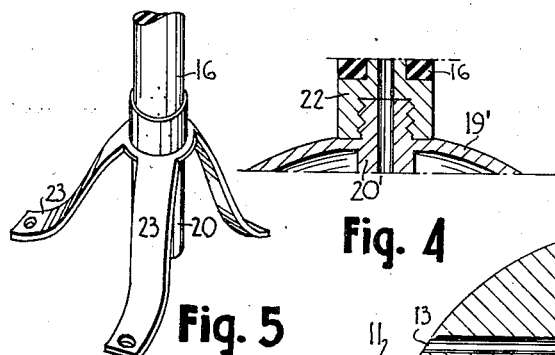
Figure 3:
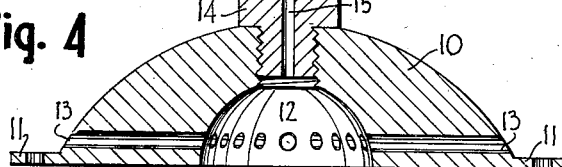
Figure 6:
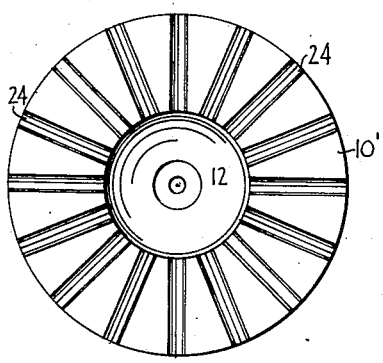

Figure 1 is a section axially of a conventional container with which the invention has been combined for practical use. Figure 2 is a section, on an enlarged scale, axially of the improved feeder assembly. Figure 3 is a fragmentary detailed section axially of the base portion of a modified construction of the invention. Figure 4 is a fragmentary detail section showing a further modified construction. Figure 5 is a fragmentary perspective view of a still further modified construction of the invention. Figure 6 is a bottom plan of a yet further modification susceptible of embodiment with the invention.

In the construction of the improvement as shown in Figures 1 and 2, the numeral 10 designates the base portion of the feeder assembly, which base portion may be formed in any desired manner from any suitable material and is preferably plano-convex, circular in outline and arranged for disposition with its convex surface uppermost. Suitable apertured ears 11 may be formed in integral radiating relation with the base 10 to receive suitable fastening means whereby said base may be fixedly or removably attached in superposed relation on the bottom of a container, such fastening means including bolts, screws, rivets, and the like. The base 10 is formed with a central recess or chamber 12 opening through the plane undersurface of said base, and suitable radial channels 13 communicate horizontally through and adjacent the lower side of the base 10 between the recess 12 and the convex exterior of said base, thus providing means through which liquid in which the base 10 is immersed may find its way to the recess 12. A threaded bore communicates axially through the base 10 with the recess 12 and provides a seat for a coupling member 14, which, in its turn, is provided with an axial bore 15. The coupling 14 is formed with a threaded boss adapted to engage within the threaded bore of the base 10, an annular flange on one end of said threaded boss arranged to close over and seat against the central portion of the base 10, and a somewhat tapered axial extension 14' rising from said flange on the side opposite to the threaded boss. The extension 14' is preferably provided with a plurality of annular ribs or equivalent exterior deformations arranged to engage the inner wall at one end of an elongated, flexible nipple 16 and hold the latter in mounted relation on the extension 14' when one end of said nipple is telescoped over said extension, a suitable clamp element 17 engaging about that end of the nipple telescoped over the extension aiding in the removable engagement of said nipple with said extension. The nipple 16 may be of any specific size, shape and construction suitable to the ends desired, and is illustrated as a relatively long, thick-walled cylinder of resilient or yieldable material surrounding an axial bore, which construction provides a suction element which closely simulates the natural source of a calf's food. With the nipple 16 formed and arranged as above described, said nipple presents a relatively long, flexible, upward extension rising from the other elements of the assembly and freely yieldable under manipulation by an animal seeking its food therethrough.

In Figure 1 the assembly hereabove described is illustrated in fixed operative combination with a conventional bucket or pail 18, the latter being shown as formed with a concaved bottom which serves to permit more complete utilization of the bucket contents through the feeder assembly and also limits the feeding of foam from the surface of the liquid through the feeder device. It is of course to be understood that the container 18 is strictly conventional and but typical of a wide range of specific containers wherewith the improved feeder may be employed.

In the modified construction according to Figure 3, the base 10 previously described is replaced by by a shell-like, concavo-convex base element 19, which latter is provided with an axially-disposed, threaded seat for the coupling 14, whereby said coupling and the elements carried thereby are mounted on and disposed relative to the base member 19 in the same manner previously set forth in respect to the base 10. In the modification, the threaded end of the coupling 14 is provided with an axial, tubular extension 20 arranged for positioning of its open lower end in closely adjacent relation with the bottom plane of the member 19, the latter being formed with a plurality of marginal notches 21 wherethrough liquid may enter the interior of the member 19 to be subjected to suction effect through the extension 20 when the assembly is operatively disposed in and relative to a suitable container.

In the modified construction according to Figure 4 is shown an alternative arrangement for operative interconnection of a base member with a nipple in the feeder assembly. As shown in the last noted figure, a base member 19', similar to the base element 19, is formed with an integral tubular element 20' depending axially within said member and having its bore aligned with that of a threaded, axial boss rising exteriorly from the base member. With the foregoing arrangement, the coupling 14 is replaced by a similar member 22 wherein the threaded boss of the former is replaced by a functionally equivalent threaded recess adapted to receive and cooperate with the threaded boss of the member 19'.

The modification illustrated by Figure 5 is in all essential operative respects similar to the embodiment shown in Figure 3, the only difference being that suitably arched, spaced legs 23 are substituted in supporting relation with the nipple, coupling and coupling extension in place of the base member 19. It is of course obvious that any suitable number of legs 23 may be employed in a given instance, and that such legs may be arranged for either fixed or removable combination with a suitable container to position the open end of the extension 20 in suitable spaced relation with the bottom of such container.

In Figure 6 is shown a bottom view of a base member and associated elements functionally identical with the arrangement according to Figure 2, the showing of Figure 6 indicating a plurality of radial grooves 24 opening through the plane surface of a base member 10', similar to the base 10 which grooves function in providing access for liquid from the container to the recess 12 in exactly the same manner as do the channels 13 of the embodiment first described.

The improved feeder, in any of its various specific or equivalent embodiments, may be operatively associated with liquid containers in such specific arrangement or multiple as may be most expedient, and when so combined provides a simple and efficient feeding device to the use of which the young animals are readily trained. In operation, suction applied to the nipple 16 by the animal produces a pressure less than atmospheric within the recess 12 or adjacent the intake end of the extension 20 and through the bores communicating through the coupling member and nipple, so that the normal pressure acting on the surface of the liquid provides a constant supply of such liquid to and through the free end of the nipple. It is to be noted that the flexible character of the nipple 16 permits considerable manipulation thereof by the animal without appreciable damage to the feeder assembly, and that the replaceable association of the nipple with the other elements of the assembly permits of ready, inexpensive and convenient rehabilitation of the device by simple substitution of a new nipple element to replace one worn or damaged in use.

Since many changes in the specific form, construction and arrangement of the elements shown and described may be had without departing from the spirit of my invention, I wish to be understood as being limited solely by the appended claims rather than by any details of the illustrative showing and foregoing description.

I claim as my invention—

1. A calf feeding attachment for liquid containers comprising a domed base member formed with a plane lower surface adapted to engage against the bottom of a container, a central, downwardly-opening chamber in said base, a plurality of radially-disposed channels communicating between said central chamber and the periphery of said base adjacent its plane surface, a coupling fitting threadedly engaging with and dising from the crown of said base, a bore axially of said fitting and vertically-disposed in communication at one end with said central chamber, and a relatively-long, flexible nipple clamped at its lower end to and rising from said fitting, said nipple having an axial bore communicating with the bore of said fitting.

2. As an article of manufacture, a calf feeding attachment for liquid containers comprising, a domed base formed with a plane surface adapted to engage against container bottoms, a central, downwardly-opening chamber in said base and intersecting the plane surface thereof, a plurality of radially-disposed, uniformly-spaced channels communicating between said central chamber and the periphery of said base adjacent its plane surface, a coupling fitting threadedly engaging and rising from the crown of said base and formed with an axial bore vertically disposed in communication at one end with said central chamber, an elongated nipple formed of relatively stiff, yieldable material removably secured with its lower end to said fitting, and a straight axial bore in said nipple communicating with the bore of said fitting.

EDWIN G. VANDERBILT.